Dec. 24, 1946. R. E. SCHURTZ 2,413,002
AUTOMATIC PLURAL TEMPERATURE TIMING THERAPEUTIC BATH
Filed June 1, 1942 10 Sheets-Sheet 6
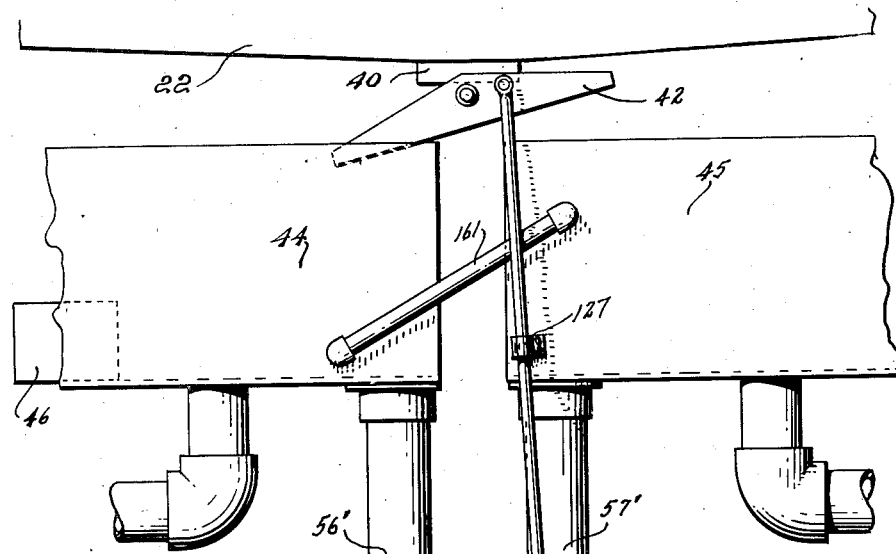
Fig. 15.
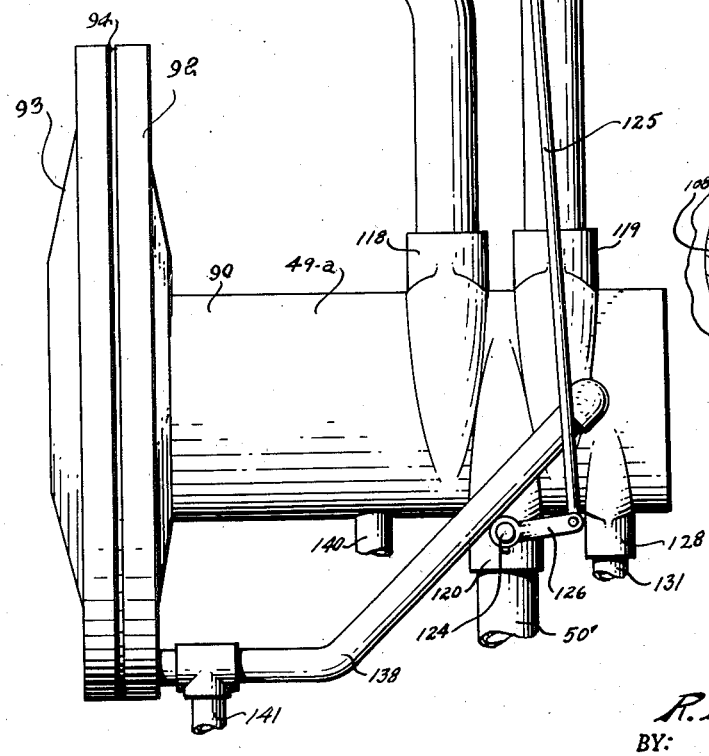
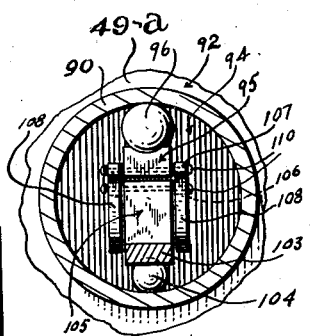
Fig. 14.
INVENTOR:
R. E. Schurtz,
BY:
Horace S. Woodward
Attorney Dec. 24, 1946.   R. E. SCHURTZ   2,413,002
AUTOMATIC PLURAL TEMPERATURE TIMING THERAPEUTIC BATH
Filed June 1, 1942   10 Sheets-Sheet 7

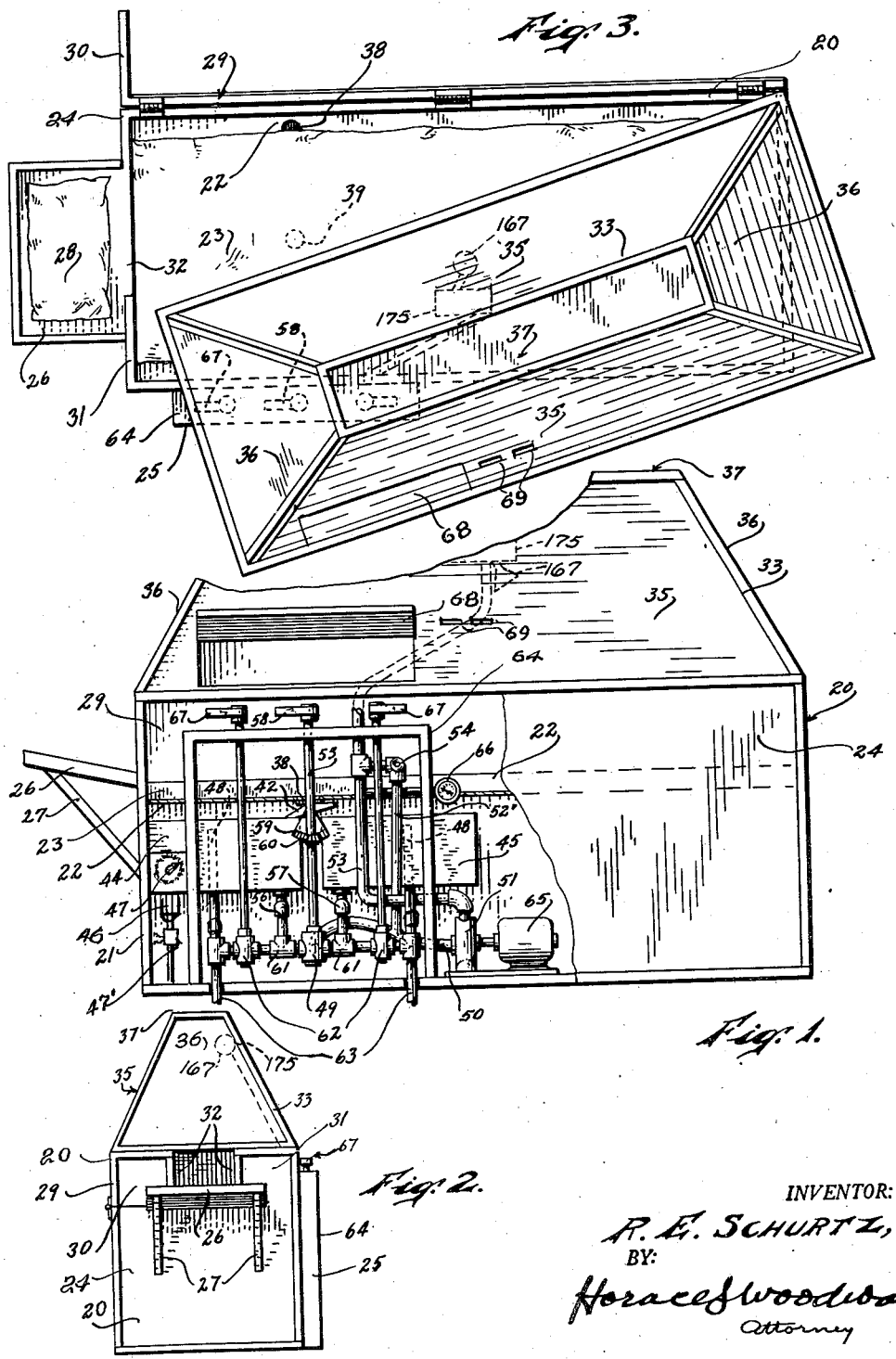

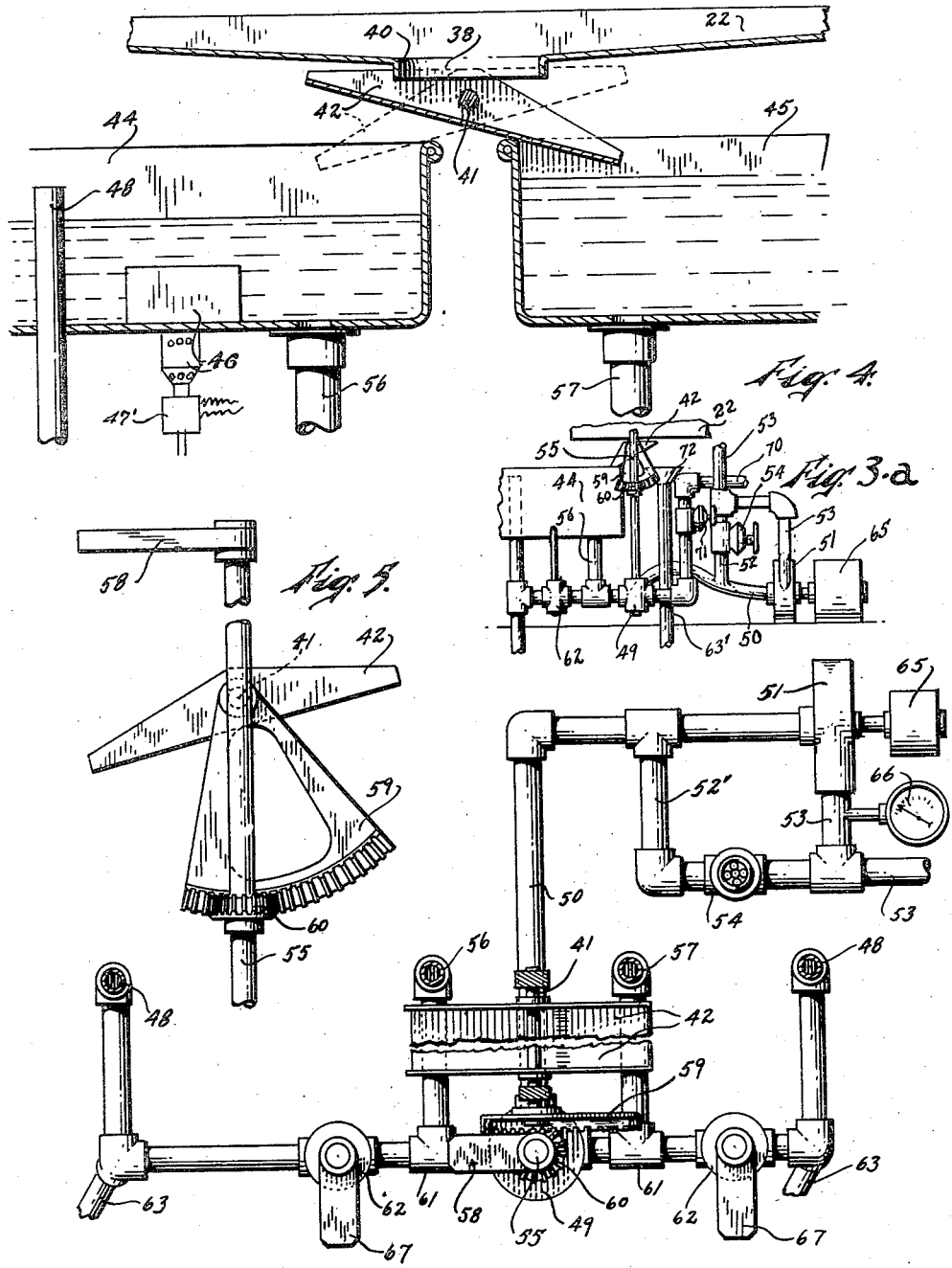

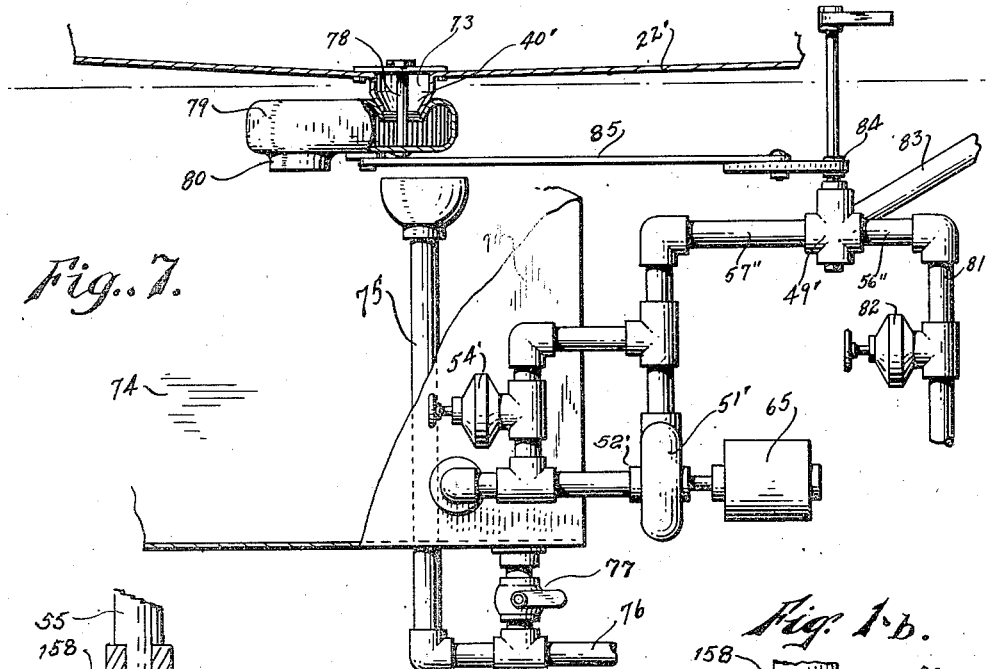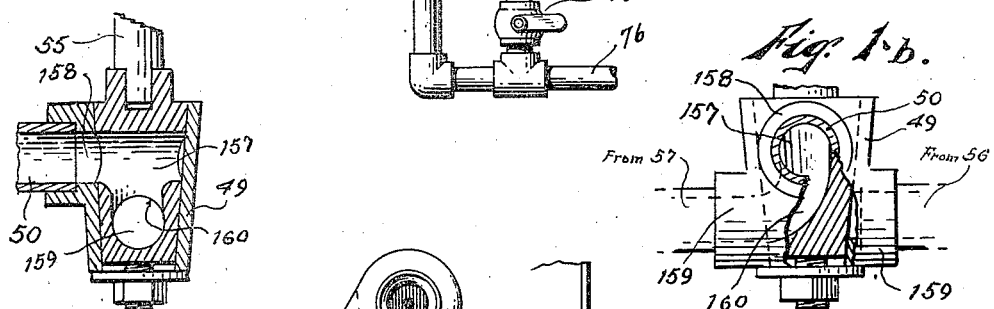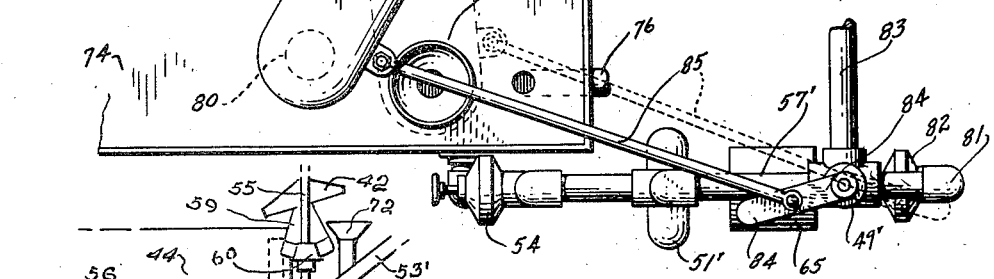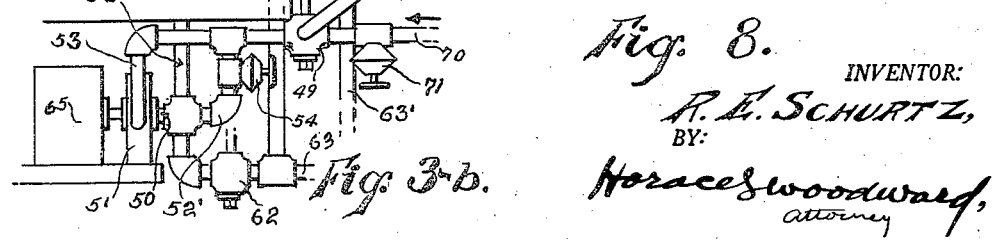

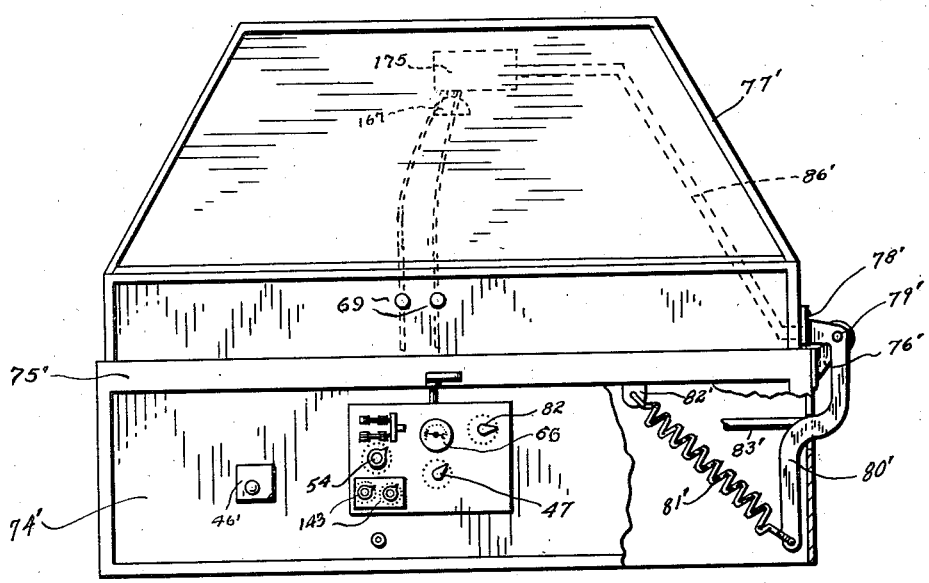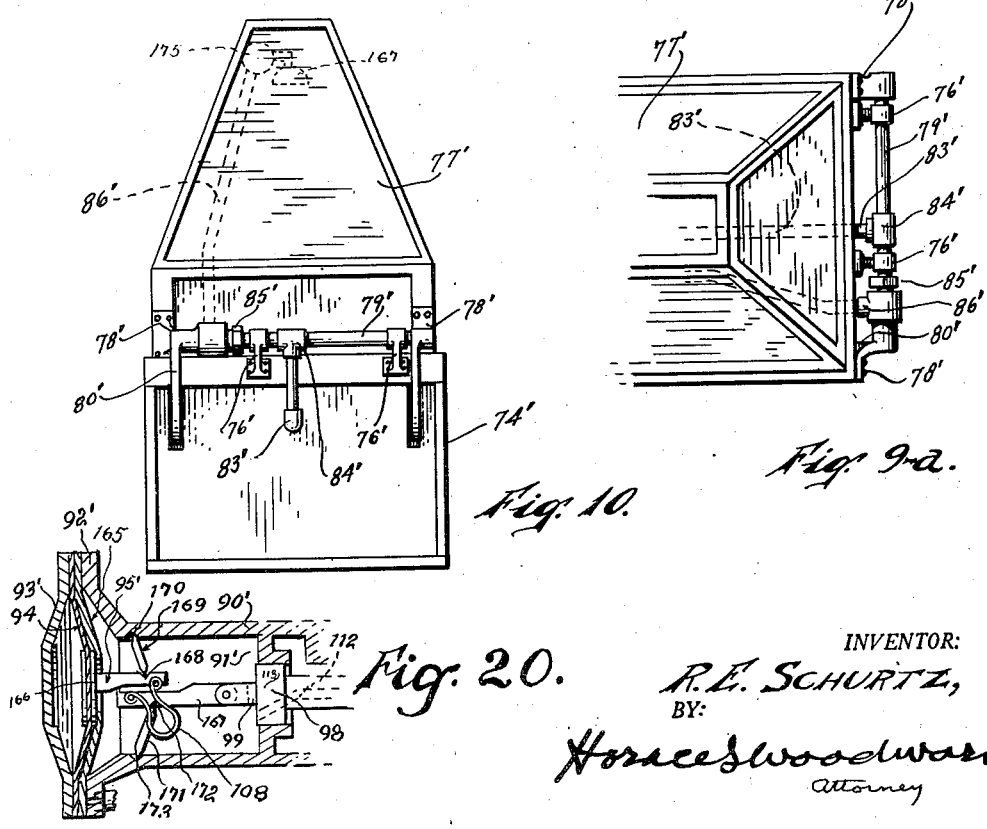

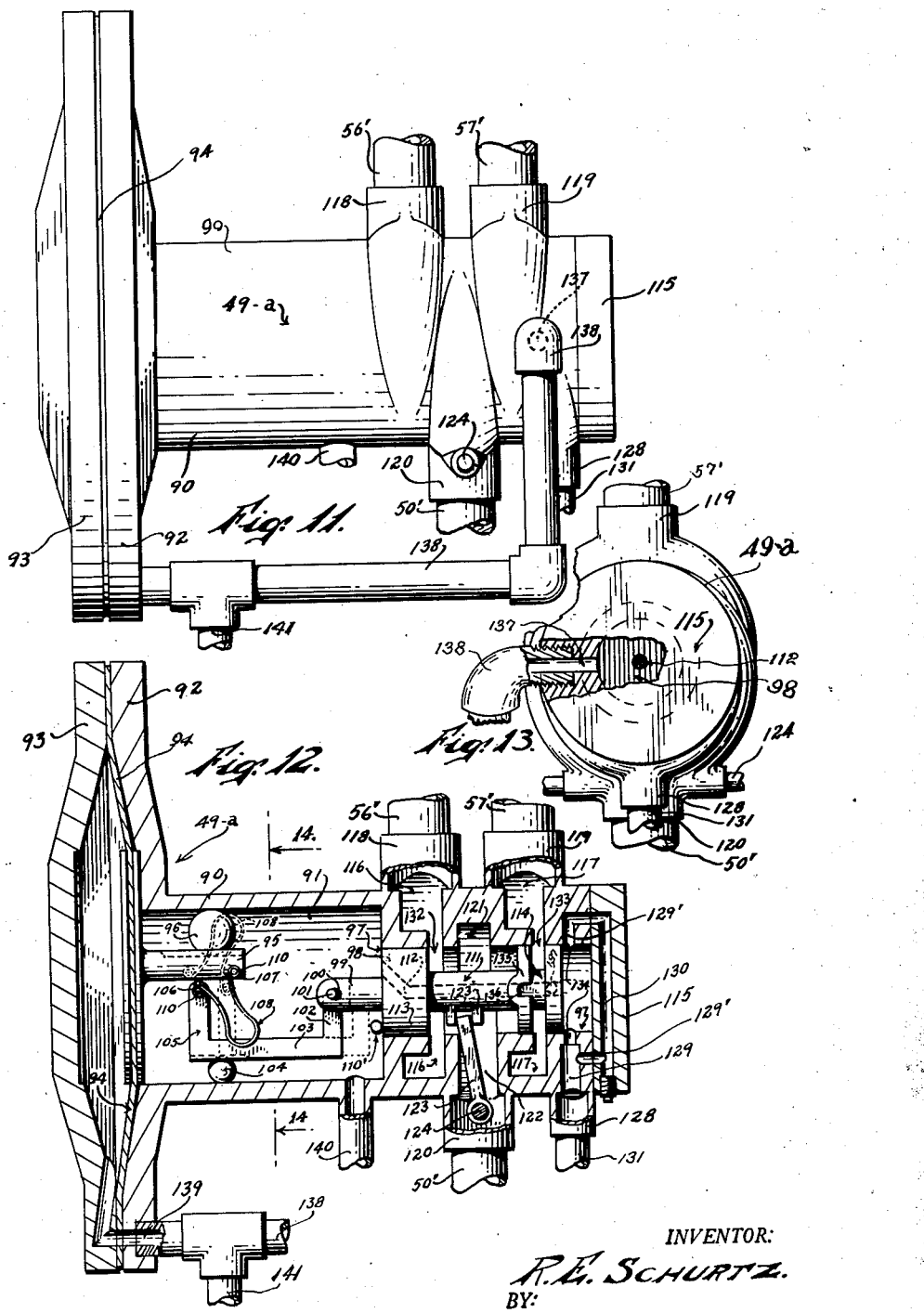

INVENTOR:
R. E. Schurtz,
BY:
Horace S. Woodward
Attorney

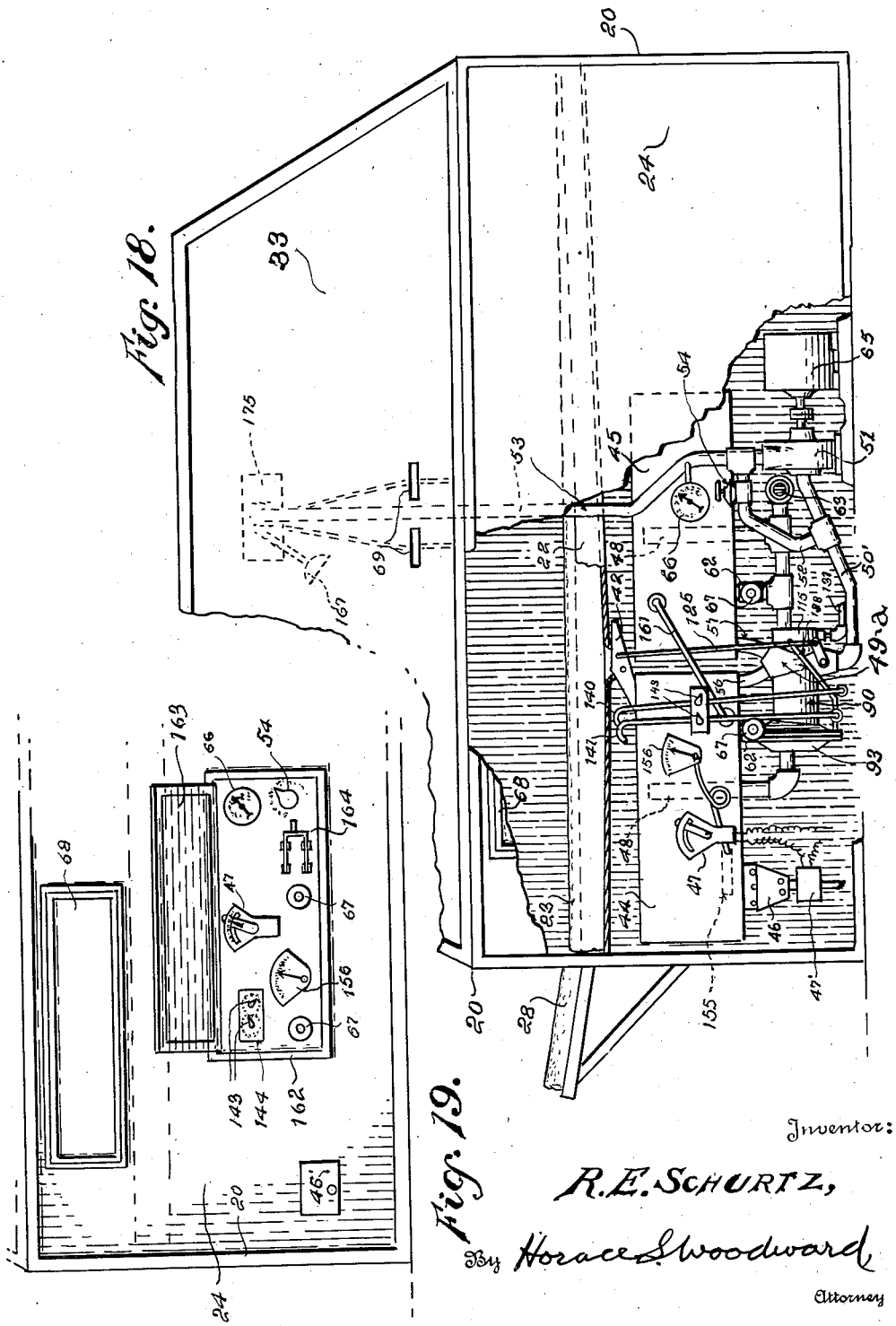

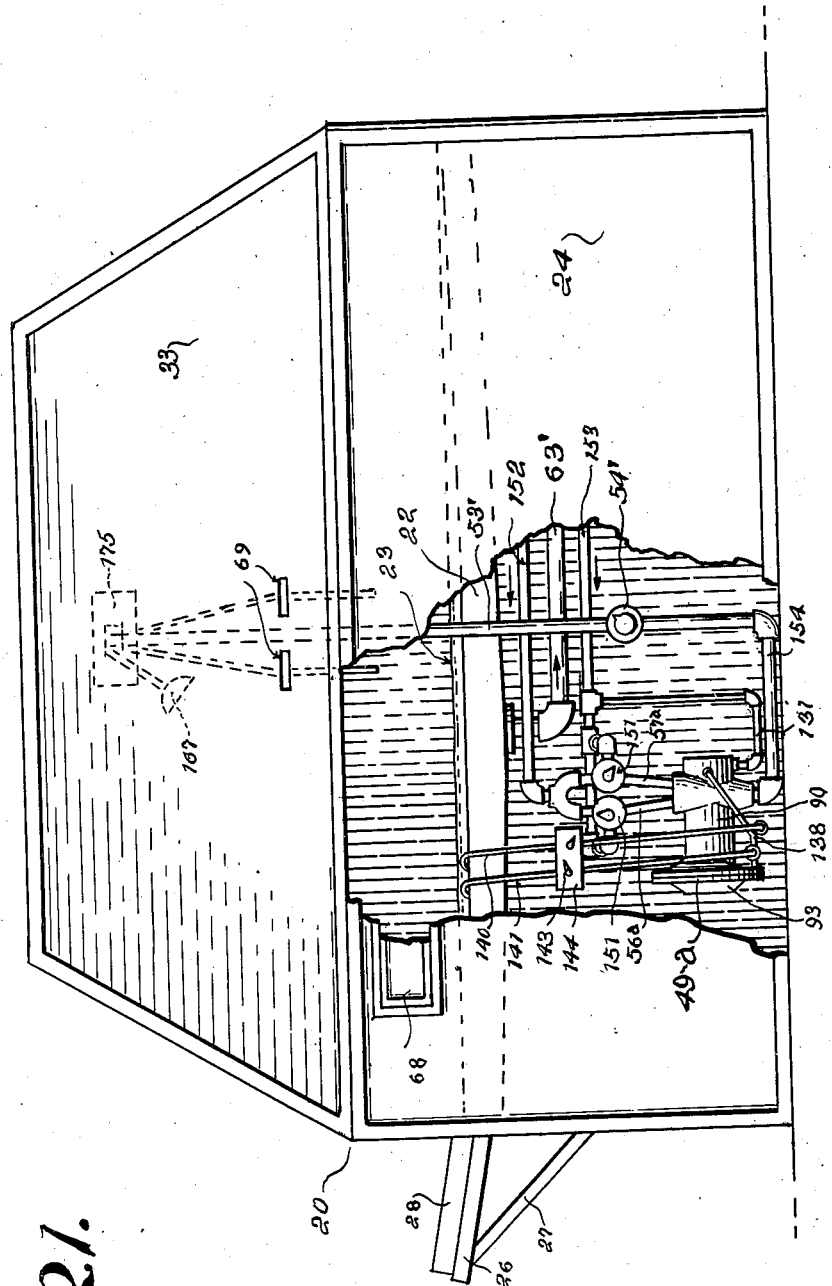

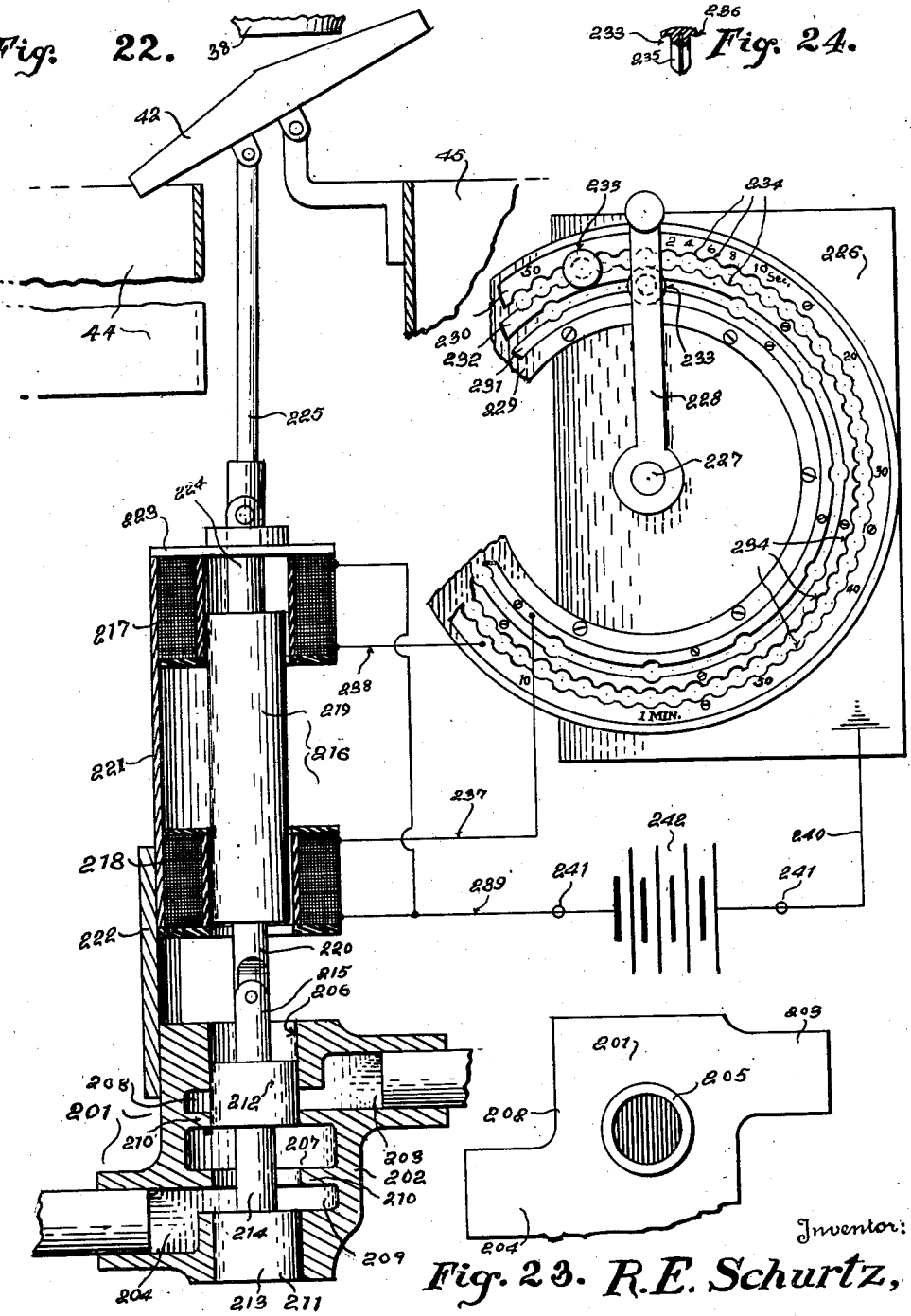
Fig. 23. R. E. Schurtz,

Patented Dec. 24, 1946

2,413,002

UNITED STATES PATENT OFFICE 2,413,002

AUTOMATIC PLURAL TEMPERATURE TIMING THERAPEUTIC BATH

Ralph E. Schurtz, Kansas City, Mo.

Application June 1, 1942, Serial No. 445,374

11 Claims. (Cl. 4—147)

The invention relates to douche apparatus, and particularly to means for administering the Scotch douche in conjunction with treatment such as may be administered by the apparatus disclosed in my Patent Number 2,292,666, of August 11, 1942, for Therapeutic bath apparatus.

Experience of the medical professions and other physicians over a long period of years has now established that the spray bath, including what is known as the "needle bath," the "fan douche," and other spray bathing methods, as well as fluid current bath practice have remarkable beneficial effects in the amelioration or cure of many ailments of human beings, and more advanced developments of these practices have established the fact that alternation of different temperatures in the water applied, in degrees appropriate to particular cases or particular types of ailments result in further pronounced benefits in most of the cases where douche treatments are indicated.

In some cases, moderate extremes of temperature and a more or less gradual change in the temperature of the water applied to a patient between the extremes decided upon are found advantageous, particularly those cases where shocking effects might be undesirable, such treatment having been found beneficial in heart ailments and in other pathological conditions, including the relief of arterio-sclerosis. In other cases, where the maximum invigorating effects are desired, abrupt changes of temperatures between wide extremes, in the stream applied to the body of a patient, is found advantageous and beneficial. While it has been recognized that the application of the simple needle bath at a low temperature is beneficial to men and women generally, especially those of feeble muscular fiber and people who lead sedentary lives, or are suffering the results of dissipation, such baths of moderate duration having a highly refreshing and invigorating effect. Such baths are principally beneficial by reason of the reaction produced by the massage effect and the application of cold water in the needle spray form. It has been stated by Dr. W. B. Oliver, "Principles and Practice of Hydrotherapy," by Simon Baruch, M. D., 1920, W. B. Saunders Co., Washington Sq., Philadelphia, Pa.:

"The massage douche and needle bath is the form of bathing best adapted to counteract the enervating effects of city life with all its attendant worries and anxieties, and would prove a boon to sufferers from nervous exhaustion. * * * In all those diseased conditions in which the loss of muscular vigor is the result of feeble digestion, depreciated nerve tone, or even of organic disease, the douche in its numerous modifications offers a method of restoring vigor which is often surprising by reason of the rapidity and completeness of the result."

For improving stamina and muscular strength of normal man, the alternated temperature bath also has peculiar value, in increasing the muscular force which may be exerted by a given person, it having been found that a cold spray under a pressure of two atmospheres will increase the sum of work which muscles are capable of doing three-fold.

Warm baths by submergence tend to diminish muscular power, but combined with mechanical irritations such as involved in a needle spray, this effect is offset largely, and when accompanied by alternated applications of low temperatures, such as 53 degrees F., muscular vigor is greatly increased and the power of resisting fatigue enhanced, in addition to increasing the actual work which muscles are capable of doing.

Other pathologic effects are obtainable with applications of this kind, including physiological thermic effects accompanied by erethemous conditions under the application of cold sprays, with the usual benefits resulting from such reaction.

It has been found that in the alternated temperature treatment, the colder the water and the more brief the applications, the more complete the reactions and stimulus evolved. In such treatments, where the cold water is applied at a temperature below 55 degrees F., it has been considered desirable never to continue such application for a period exceeding one minute, and it is judged by medical authorities that it should usually occupy only from ten to thirty seconds upon any one part of the body.

Treatments of this kind are beneficial for the general health, in specific organic disturbances, or illnesses, neurotic conditions, enhancing the recovery from wounds, and relief of conditions where local reactions are desired. These benefits develop from the fact that the percussion and vibratory influence as well as thermic irritation arouse the vaso-motor system, arouse the nerve centers by which respiration is deepened, the circulation invigorated and secretions increased. The treatments are also beneficial because the application of water accompanied by the percussion of thermic massage excite the neuro-vascular structures, serving as an admirable sorbefacient of pathological products especially when accompanied by the alternated hot-cold applications, in addition to other benefits attained, some of which have been enumerated above.

From the foregoing, the utilization of my invention as hereinafter disclosed will be understood and its advantages appreciated, the practices indicated being largely applied abroad, and in many health resorts and hospitals in this country.

It is therefore an important aim of this invention to present a means whereby a bath of the general character indicated may be applied by automatic means without requiring the constant manual direction of bath sprays and manipulation of valves to effect the changes of temperatures desired. It is a particularly important object of the invention to present an apparatus which may be set at will to produce alternated series of hot and cold applications, the predetermined lengths of the respective temperature periods being maintained automatically, although variable at will, independently of each other, so that if desired, the device may be set to give a long period of warm applications alternated with extremely short periods of cold applications, or, may be set to lengthen the cold applications with longer or shorter periods of warm applications than first referred to.

A further aim is to present an apparatus in which the two extremes of temperature may be readily controlled by simple settings of the device. All of this is with the end in view of enabling a patient to be introduced into position to receive the spray or other bath applications, and to then set in operation my invention so that the desired specific treatment suited to the case in hand will be automatically applied without further attention from physicians or attendants.

An important aim of the invention is to present an apparatus of this kind which may be utilized by physicians without requiring mechanical aptitude or familiarity with the machine, or training in the particular construction of the bath apparatus, or its operation, but by the simple setting of respective dials or pointers which may be calibrated at minutes or seconds, for application of hot or cold water or solution, and the adjustment of respective temperature controls for the two sources of supply, and so that the desired treatment may be attained by a simple positioning of the patient in the bath apparatus or with respect to the spray head, nozzle, or other device from which the water is passed to the patient.

A further important aim of the invention is to present apparatus which may be cheaply constructed and yet will operate with the utmost certainty and dependability.

A further important object is to present apparatus which may be embodied in a unit which may be set up without requiring plumbing connections, and requiring only the plugging in of an electrical connection in the ordinary electric service outlets now generally installed throughout homes and office buildings and hospitals.

It is also an aim to enable the unit to be incorporated by merely connecting the influent ducts to hot and cold water supply pipes or spigots, and its effluent to a usual waste pipe.

A further important purpose of the invention is to present an operative mechanism for the operation of a valve or valves so that the alternate admissions of hot and cold water to the spray nozzle and the timing thereof may be accomplished without requiring special electric motor therefor or mechanical transmissions but utilizing simply the flow of water to the spray nozzle.

And further, it is sought to present a novel means to effect this alternation and timing of hot and cold water flow, and to coordinately control the disposal of the waste so that, in a system where conservation of the bath fluid is necessary, the hot and cold fluids may be preserved in separate reservoirs in the machine being drawn therefrom for supply to the spray, and returned thereto respectively after use.

Additional objects, advantages, and features of invention reside in the construction, arrangement, and combination of parts involved in the embodiment of the invention, and in its functions, as will be more clearly apparent from the following description and accompanying drawings, wherein Figure 1 is a rear side elevation of a bath apparatus, partly in section;

Figure 1—a is a longitudinal section of a two-way plug valve suitable for use as the valve 49.

Figure 1—b is a similar view at right angles to Fig. 1—a.

Figure 2 is an end view of Figure 1.

Figure 3 is a top view thereof.

Figures 16, 17:
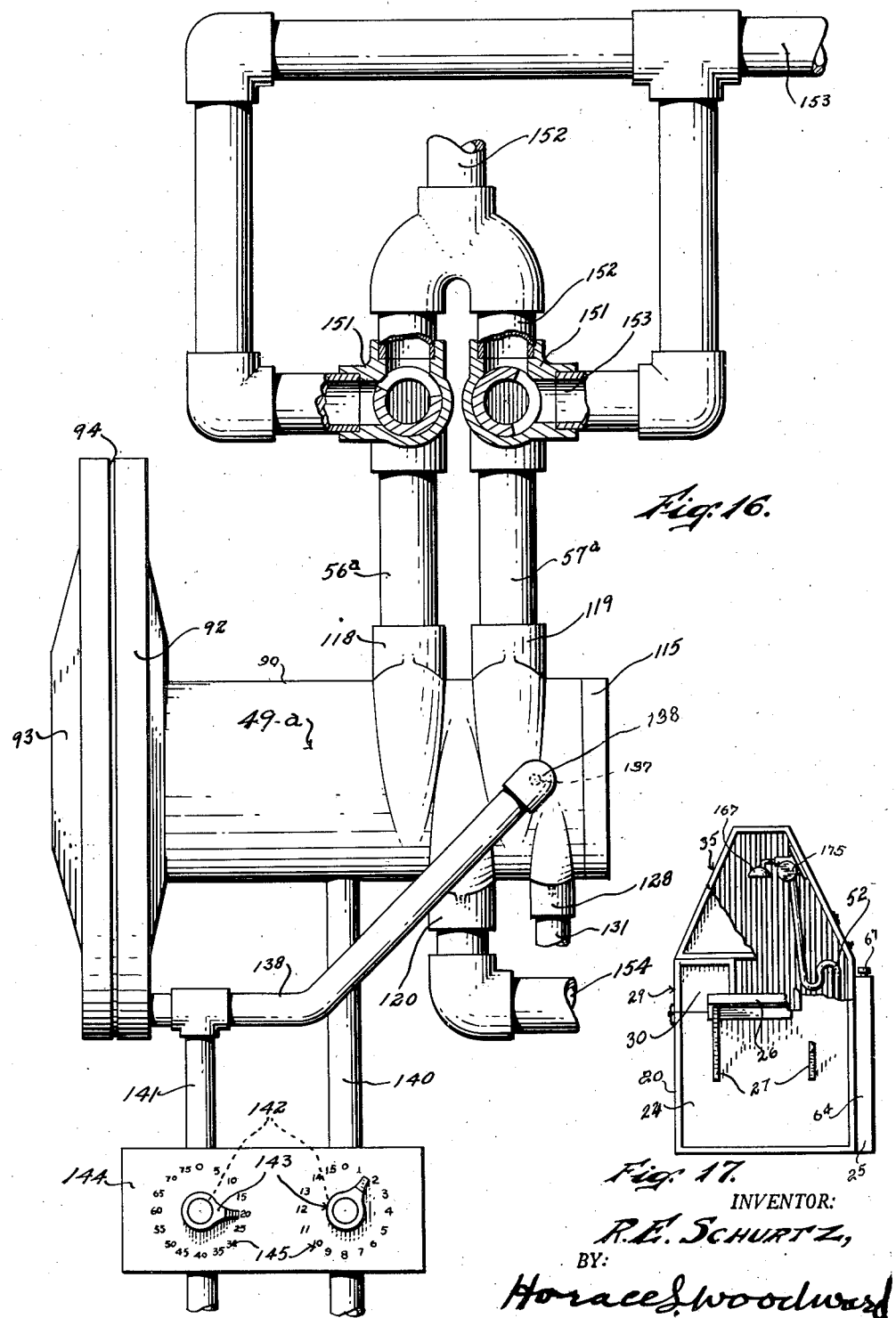

Figure 3—a is a fragmentary view similar to part of Figure 1, showing a single-tank apparatus, this being suitable where a low pressure cold water pipe supply is available.

Figure 3—b is a similar view showing a further arrangement of parts for a single tank apparatus in which a pump is utilized to move the water from the tank to the spray head, and a water main cold water supply is carried directly to the spray head, independently of the pump.

Figure 4 is an enlarged fragmentary section showing the tilting trough.

Figure 5 is an enlarged detail of the valve and tilting trough connection;

Figure 6 is a plan of the valve and pipe system.

Figure 7 is a fragmentary elevation with parts broken away, of a modified single-tank construction.

Figure 8 is a fragmentary plan of the valve and trough devices of Figure 7.

Figure 9 is a rear side elevation of a tilting cover cabinet.

Figure 9—a is a fragmentary top view of the last named.

Figure 10 is an elevation of the foot end thereof.

Figure 11 is an elevation of the automatic hot and cold water valve;

Figure 12 is a longitudinal sectional view of the last named.

Figure 13 is an end elevation of the last mentioned valve.

Figure 14 is a cross section on the line 14—14 of Figure 12.

Figure 15 is an elevational view of the last mentioned valve used with hot and cold water tanks.

Figure 16 is a similar view showing the valve used with piped hot and cold water supplies.

Figure 17 is a sectional view of a cabinet showing my spray head mounted fixedly on the cover for translative movement with the cover.

Figure 18 is a view similar to Figure 1, showing the complete installation using the automatic valve device 49—a;

Figure 19 is a fragmentary rear elevation of the portion broken away in Figure 18.

Figure 20 is a sectional view corresponding to the left hand portion of Figure 12, showing a simplified construction of the connections between the diaphragm and valve 98.

Figure 21 is a view similar to Figures 1 and 18, showing an embodiment of the invention in its simplest form as far as construction of the circulatory system and the installation are concerned, when hot and cold water are available from piped supplies, or mains.

Figure 22 is a view of a construction of the invention utilizing an electrically operated valve, the valve and operating device being in section, an automatic timer switch being in elevation and the electrical circuit being shown diagrammatically.

Figure 23 is an elevational view of the valve showing the outlet port.

Figure 24 is a detail of a shiftable contact for the switch.

Referring more particularly to the drawings, there is illustrated a cabinet 20, including a framework 21, supporting at a convenient height for the uses indicated a bath tray 22, which, in Figures 1 and 2, is at least long enough to accommodate the body of a patient excepting the head, as will appear, and in the tray there is disposed a mattress 23 which may be covered with a waterproof material. The lower part 24 of the cabinet comprises a housing within which certain operative devices, such as pump, valves, and tanks (to be subsequently described) may be accommodated. An access opening of convenient size, with appropriate closure 25 is provided in this lower cabinet housing. At the end of the cabinet a head rest tray 26 is extended from the end of the cabinet, supported by stays 27 and having thereon a pillow 28 which may lie at the same level as the mattress 23, or may be slightly elevated thereabove, as preferred. At the front side of the cabinet, the wall of the lower housing stops on a level with the top of the tray 22, and has hinged thereto a drop door 29, which may be lowered to position against the side of the housing below the level of the tray and mattress at times, or raised to a vertical position extending a substantial distance above the mattress, as may be seen. This door has a right-angle wall extension 30, which, when the door 29 is raised to erect position, extends inwardly toward the rear partly across the head end of the cabinet, stopping short of the medial longitudinal vertical plane of the cabinet sufficiently to clear the neck of a patient whose head rests upon the pillow 28, while his body is reclining upon the mattress 23. The back wall of the housing 24 is extended to a level above the tray a distance corresponding and equal to the height of the door 29 when raised, and at the head end of the housing there is extended from the back wall at right angles, a short wall 31, which corresponds to the part 30 of the door when the latter is closed, and between the wall extensions 30 and wall portion 31 a neck opening 32 is thus formed, and, if desired, any additional means may be provided for securing a snug fit of closure around the neck of the patient.

At the foot of the cabinet, the housing wall is extended upwardly to the same extent as the back wall, door 29, and parts 30 and 31; so that when the door 29 is raised to closed or vertical position, a wall extends continuously around the tray 22, interrupted only at the neck opening 32, this wall having a height considerably greater than the height of the body of a patient reclining upon the mattress 23.

Pivoted upon the frame at the front rear corner thereof there is a horizontally swinging cover 33, somewhat in the form of the frustrum of a pyramid having an oblong rectangular base, and including front and back walls 35 inclined toward each other, and end walls 36 likewise inclined, with a horizontal top plate 37 forming a junction with these four walls.

In the present instance the tray is formed near its head end with outlet openings 38 adjacent each side of the tray, the mattress being sufficiently narrow throughout its length to clear these outlets and to afford a space between the sides of the tray and mattress for ready longitudinal flow of water and other liquids, the tray being slightly inclined downwardly toward these outlets for drainage of liquids to the openings 38. The tray may also have outlets 39 through its bottom spaced inwardly beneath the mattress and closed thereby, although other means may be utilized for such closure, if desired.

Around the outlets 38 there are formed short downwardly extended spout portions or lips 40, for guidance of liquids from the tray as desired, and revolubly mounted beneath the tray and extended transversely of the tray beneath the tray and extended transversely of the tray beneath these spout portions, there is a rock shaft 41 upon which one or more tilting troughs 42 may be mounted, one being shown, extending in both directions longitudinally of the tray from the shaft, and capable of movement so as to incline downwardly toward the head of the tray in one position of the shaft, and downwardly toward the foot of the tray in the other, at all times being open for reception of liquid from the outlet 38.

Beneath the tray 22 in one form of the invention, are two tanks 44 and 45, respectively, which may be conventional open tanks adapted to hold a suitable quantity of water or bathing solution, and one of the tanks may include any conventional means for heating the same to a desired temperature, including any conventional thermostatically controlled heater 46 including a thermostat 47 conveniently located at the rear of the cabinet, as will subsequently be explained. These two tanks have transverse planiform ends located closely to each other and immediately under and in alinement with the shaft 41, or parallel to the same, being located so close together and spaced sufficiently below the shaft as to permit the trough member 42 to be inclined alternately at its ends to one tank or the other, according to the position of the shaft 41. It thus may be operated to direct effluent material from the tray into either of the tanks, by rocking of the shaft 41, as required. Each of these tanks is provided with a safety overflow standpipe 48 leading to a suitable waste duct, and also each tank is provided with an outlet port or opening in its bottom, from which respective feed water pipes 56 and 57 lead to a main control valve 49, by which the flow from either pipe alternatively may be directed to a pump supply pipe 50, leading to the intake of a centrifugal or other pump 51 suitable for the uses hereinafter indicated and also indicated in the introduction to this specification. The outlet from this pump may lead to the standpipe 32 of my prior co-pending application, and if desired, a by-pass connection 52' may be provided, from the outlet duct 53 of the pump, to the feed pipe 50, which by-pass may include a pressure controlling valve 54.

The valve 49 may be of a conventional two-way type, so that liquids from the ducts 56 and 57 may be alternately directed to the pipe 50, and in the simplest form of the apparatus this valve may be of a rotary type on a vertical axis including a valve rod 55 extending upwardly at the rear side of the apparatus and having a horizontal lever handle 58 thereon adapted to be operated by the patient in the cabinet or an attendant outside the cabinet.

In the present instance this valve is coordinated with the rocking trough 42 so that when the valve is in position to feed hot water to the pipe 50, the trough 42 will be inclined in the position shown in dotted lines in Figure 4, so as to discharge water from the tray into the hot water tank 44, and when the valve is in the opposite position, supplying cold water to the pump, the trough 42 will be oppositely inclined, so as to deliver cold water to the tank 45. In the present instance this is obtained by locating the valve rod 55 on an axis intersecting the axis of the shaft 41, but located outwardly of the end of the latter, and mounting the large bevel gear 59 on the end of the shaft 41, and a small bevel gear 60 on the rod 55, meshed with the gear 59, so that movement of the lever 58 will rotate the gear 60, and so move the gear 59 to a lesser degree, so as to rock the shaft 41 to the limited extent required while the lever 58 is moved through a radius of 180 degrees. The latter extent of movement is desirable in order that the direction of the handle lever 58 may positively indicate whether hot or cold water is being supplied to the pump for application to the body of a patient within the cabinet. The connections between pipes 56 and 57 and the valve 49 may include a T element 61 leading through valves 62 to respective waste pipes or ducts 63, which may discharge into a common drain or other place of disposal of waste products.

For the convenience of attendants, and also to enable a patient to operate the apparatus if desired, as would be the case where the apparatus is maintained in a private home, in many instances, an instrument panel or case 64 is formed in the back of the cabinet, which may support a frame or suitable closure, as may be readily understood, and the valve 49 is located centrally of this panel, with the waste valves 62 on respective sides thereof, substantially as shown in Figure 6, and in Figure 1. The pump 51 is shown as direct-connected to an electric motor 65, which may operate constantly, and the valve 49 may have an intermediate position in which the intake 50 will be closed, when it is not desired for the spray to operate. The panel frame may be utilized for the mounting of the thermostat 47, a pressure gauge 66 being connected with the outlet duct 53 between the pump and the pressure regulating valve 54, as indicated in Figure 1. The thermostat 47 may include a hand knob and pointer and a suitable fuel valve or switch on the heat control, so that an attendant may set the thermostat to maintain any desired temperature in the water of the tank 44.

It should be noted that in the use of the simple type valves 49 and 62, it is possible to arrange the handles with which these valves are operated so that when they point outward transversely of the cabinet, they are closed and so indicate, and when opened, the direction of the handles will indicate the direction of flow of liquid therethrough. If desired, the panel structure 64 may be located inwardly of the plane of the back wall of the housing 24, so that the handle 58 of the water temperature control valves 49 and the handles 67 of the waste valves 62 may be operated by a patient under treatment within the cabinet, and by providing a small access door 68 in the rear of the cover immediately adjacent the panel frame 64, an attendant may operate these valves from the exterior of the cabinet. If desired, the trough 42 may extend entirely across the bottom of the tray 22, or individual narrow troughs may be provided for each of the outlets 40, this being within discretion of the manufacturer and user.

The device utilizing both the tanks 44 and 45 are suitable for situations where the apparatus is mounted in a room distant from sources of water supply, or where it is not possible to make direct plumbing connections, but in other situations, it may be possible to utilize hot and cold water supply through plumbing fixtures from a distant source, or to utilize cold water supply for the cold shower and utilize a local hot water supply in the form of a tank corresponding to the one 44, the latter arrangement being illustrated in Figure 3—a, in one form. In any of these devices, the control wheel by which speed of the spraying device within the cover of the cabinet is varied and controlled, may be located so as to project through a slot 69 in the cover when closed, enabling it to be operated either from the exterior or interior of the cabinet.

In Figure 3—a, a cold water main 70 is shown connected to the valve 49 in the same situation as the pipe 57, and corresponding thereto, a pressure control device 71 being incorporated in the main, so as to control the pressure supplied as may be required, although water may pass through the pump 51 in the same manner as the hot water from the tank 44.

In the device of Figure 3—a the need for the cold water tank is obviated, and the tilting trough is utilized to direct the water from the outlet 40 into a hopper 72 discharging into a waste pipe 63', corresponding to the one 63 of Figure 1. The apparatus may otherwise be the same as that first described. In case a hot water supply is obtained from a main, as well as a cold water supply from a main, and there is no need to conserve the water from either source, an arrangement may be made whereby a waste pipe is led directly from the discharge openings 38 and 39 of the tray 12, this being sufficiently obvious in the structure to require no illustration.

In Figure 7 a modified construction for attaining the conservation of hot water in a pump circuit including the spray nozzle, while the cold water is obtained from a main and discharged through a waste pipe, is illustrated. In this instance, the bath tray 22' corresponding to the one 22 first described, is formed with a transverse channel 73 near the head end thereof, from which a single discharge opening 40' opens downwardly over a tank 74 for hot water, which may have therewith the usual heater 46, as before indicated. An overflow stand-pipe 75 is mounted in this tank, leading downwardly to a waste pipe 76, and a drain connection at the tank bottom may be made at 77 with the same waste pipe, with an included valve therein as shown. Mounted slidably on a bolt 78 or other guide means under the tray 22', there is a shiftable trough 79 of elongated form. As shown, one end is swivelled at the discharge spout 40', while the other end of the trough is formed with a downwardly directed discharge spout 80, which, in one position of the trough, lies over the upper flared end of the stand-pipe 75, so as to discharge directly thereinto, the trough however being horizontally movable upon the bolt 78 swingingly at this end so as to be moved from the pipe 75 to position where it may discharge directly into the tank 74. In this system, a two-way valve 49' is used, the pump 51' having its intake connected constantly to the tank 74, and its discharge 57'' to one side of the valve 49', a cold water pipe 81 leading to the same valve from a supply main and including therein a pressure regulating valve 82. The outlet 83 from the valve 49' may lead directly to the spray nozzle in the cabinet as heretofore indicated. The valve 49' for convenience is shown as a simple plug valve having a handle 84 which is elongated to constitute a lever, to which a link 85 is connected, extending to the trough 79 and connected thereto so that as the valve is operated the trough will be swung correspondingly. With the handle 84 at left hand position as in Figures 7 and 8, water from the tank 74 through the pump will be directed to the pipe 83 and spray nozzle. When the handle is swung to the right however, the warm water is cut off and the cold water from the pipe 81 admitted to the pipe 83. At the same time the link 85 will swing the trough 79 to the position dotted in Figure 8, over the stand pipe 75, so that the cold water returning from the tray 22' will pass into the overflow pipe 75. At this time the discharge from the pump is bypassed to its intake at 52' past the pressure regulating valve 54', in analogy to Fig. 6 as heretofore described.

In the last two described forms of the invention, panel arrangement and auxiliary instruments may correspond to those involved with the device of Figure 1, as may be understood.

While a simple hand valve has been illustrated in the foregoing described structure, principally to simplify the disclosure of the circulatory system, it is contemplated to use an automatic valve thereat, as first mentioned, as will be described hereinafter.

In Figures 9 and 10 there is illustrated a modification of the cabinet structure in which the water supply and distribution system may conform to any of the arrangements before described with the exception that the pipe leading from the water control system to the nozzle is passed through a hinge pivot of the cover of the cabinet, which in this instance is pivoted to lift instead of being horizontally movable. In this case, also, it is contemplated to mount the spray device on the movable cover, so as to be contained and movable therewith translatively as a unit with the servo-motor of the spray head and other immediate adjuncts (see Fig. 17). Here the lower section 74' of the cabinet may be the same height as the upper edge of the bath tray 75' which may generally correspond to forms of trays above described. Hinge brackets 76' are provided on the foot end of the lower cabinet section, and fixed upon the adjacent end of the cover 77' there are corresponding brackets 78'. A pivot pipe 79' is mounted on the brackets 76', upon which the cover brackets 78' are revolubly engaged, so that the head end of the cover may be lifted with the pipe 79' as a pivot. The brackets 78' are mounted with downwardly extended arms 80', which may be extended inwardly into the lower section of the cabinet as shown in Figure 9. Connected between the extremities of these arms and suitable anchorages 74' in the base section of the cabinet there are respective counterbalancing springs 81', so that when the cover is lifted, much of its weight is initially counterbalanced by the tension of the springs, and a minimum of effort is required to manually lift the cover. It will be seen that by the movement of the arms 80' convergently toward the anchorages 82' of the springs, the tension on the latter will progressively decrease as the cover 77' is raised. The pipe 83' in the lower part of the cabinet, carrying the supply for the spray head, is led to a T 84' in the pipe 79', and the bracket 78' has fitted thereon a packing box or the like 85', engaged around the pipe 79', the bracket 78' being hollow, and the portion 84' of the pipe 79' having a port therein opening into this hollow portion of the bracket 78'. A conduit extension 86 is extended from the bracket 78', within the cover 77', from which it may be extended to the supply line for the spray head of my invention, as constructed in my prior application hereinbefore referred to, to which reference is made for an understanding of the structure thereof.

All of the foregoing is made with a view to disclosing generally the operative elements and functions of my apparatus and system for administering alternate hot and cold treatments from an oscillating or other spray nozzle, and in order to obtain the automatic functioning of the alternated administrated treatment of the two different temperatures, I have disclosed in Figures 11 to 14 inclusive, a valve and valve operating unit which may be utilized at the location of the valve 49 or at the most convenient location thereadjacent for the operation of such a valve as shown at 49 or 49—a, or such other type of valve as may be found most advantageous for use with my automatic system.

The automatic valve device is indicated generally by the character 49—a, and consists in the present instance of a case including a case body casting 90, which, in order to obviate the need for wear lining or the like is preferably cast in a durable bronze, of generally cylindrical form, including a cylindrical chamber 91 open on the left-hand end of the body in the present device, and around this open end being provided with one-half of a diaphragm housing 92 of conventional form, the opposite half 93 of which may be bolted thereto upon an intervening diaphragm 94 of suitable material, the diaphragm housing affording sufficient play of the diaphragm and for access to the chamber 91 for the purposes hereinafter indicated. In this particular instance, the diaphragm housing is of circular form, but is eccentric to the body portion 90 and chamber 91, so that the center of the diphragm is above the axis of the chamber as viewed in Figure 12. A sliding stem 95 is fixed on the diaphragm, extending longitudinally into the chamber 91, coaxial with the diaphragm and spaced above the axis of the chamber, this being guided by a ball or roller bearing 96, travelling in a suitable groove on the upper side of the stem and against the upper wall of the chamber 91. The body 90 at the end opposite the chamber portion is formed with a reduced cylindrical bore 97, in which a plunger valve 98 is reciprocable, this valve having a stem 99 extended longitudinally into the chamber 91 on the axis of the latter, and formed with a transverse aperture or slot 100 therethrough at its extremity, this aperture being broadened longitudinally of the stem, and receiving an operating pin 101 of cylindrical form therethrough, so that this pin has lost-motion longitudinally in the stem for a limited distance. The pin 101 is carried by a driving member 102, which may be a casting or bar, formed in substantially U-shape, the pin being at the extremity of one upstanding arm, while the bight portion 103 thereof is of rectilinear form extending horizontally in the chamber and in close parallel relation to the lower side of the latter, a ball or roller bearing 104 being interposed between this part of the driver and the lower wall of the chamber, so as to support the driver, as will be apparent. If desired, the under side of the driver may be grooved to aid in preserving longitudinal alinement, and the wall 91 of the chamber may be similarly grooved as indicated, for the same purpose. The upper end of the outermost arm 105 of the driver 102 is notched on its upper end, as at 106, while the under side of the stem 95 is similarly notched, as at 107, in such manner that, with the driver 102 at the left-hand limit of its movement, which is the longitudinal outer limit, when the diaphragm moves to its full stroke to the left with the stem 95, the notch 107 on the latter will move slightly outwardly of the notch 106, and similarly when the driver is at the right hand limit of its movement with the valve, when the diaphragm moves to its right hand limit, the notch 107 will pass inwardly beyond the notch 106, all for a special function which will be subsequently indicated.

A U-spring 108 is provided, the arms of which are curved inwardly toward each other, and provided with lateral pivot pins 110 at its extremities set revolubly in respective notches 106 and 107 and held therein by expansive force of the spring. This spring is under compression between the stem 95 and the driver 102, so that the latter is pressed downwardly upon the anti-friction bearing 104, while the stem 95 is pressed upwardly against the anti-friction bearing 96. The claw portions of the spring 108 are extended laterally of the body portion of the spring, so that the latter is set off from the vertical plane of the driver and the stem 95, and may swing beside these two at times, as will be hereinafter explained. In addition to pressing the driver downwardly and pressing the stem 95 upwardly, the spring 108 also thrusts the driver longitudinally in its chamber: when the diaphragm is at the inner limit of its movement this thrust being exerted outwardly so as to hold the plunger valve 98 at the left-hand limit of its movement, as viewed in Figure 12, but when the diaphragm is at the left-hand limit of its movement the spring 108 extends upwardly, and thrusts the driver inwardly, as well as holding it downwardly.

In the movement of the diaphragm toward the left, the upper end of the spring 108 is drawn toward the left and carried longitudinally beyond its lower end, so that the loop of the spring is caused to rotate on the lower end as a pivot or step bearing, until the loop portion of the spring is extended upwardly instead of downwardly, as in the position illustrated by dotted lines in Figure 12, and its upper end being then longitudinally outward of the arm 105, the spreading tendency of the spring and its thrust against the last mentioned arm resulting in pushing the driver inwardly longitudinally within the chamber so as to move the plunger valve to the inner and right hand limit of its movement, as will be understood. Opposite movement of the diaphragm results in a reverse operation by which the driver and plunger valve are again moved to the outer limits of their movements as illustrated in Figure 12. This movement may be checked by any suitable stop device, which may be a screw 110' engaged through the wall of chamber 91, although other means may be employed as found desirable. The function of the slot aperture 100 in the operation of the device is such as to permit a certain amount of longitudinal movement of the driver 102 before it engages the plunger valve to move the latter, and thereby gives the spring 108 an opportunity to move a sufficient distance to obtain the best advantage from its expansive action in order to move the valve with certainty. This lost-motion occurs on the movement of the driver in each direction.

The plunger valve is substantially spool-shaped, having a central body portion 111 of reduced diameter, in its central part, and having a small axial bore or port 112 extending entirely through the valve, opening beside the stem 99 on the left-hand end, and opening concentrically through the end of the valve at the right hand end, as indicated. At the left position of the valve, Fig. 12, this port forms communication between the right side of the diaphragm 94 and an operating water port 129 in the case, as will be described. A broad land 113 is formed at the left-hand end of the valve on its larger diameter, and a corresponding part at the opposite end is formed with a circumscribing narrow groove or channel 114, which may be termed a port channel. The bore 97 is of a length slightly longer than that of the length of the valve between the left hand limit of the land 113, and the opposite extremity of the valve and the end of the bore at the last mentioned part is closed by a cap plate 115.

Cored in the wall of the valve body 90 circumscribing the bore 97, there are longitudinally spaced water passages 116 and 117, respectively, the one around the left hand end portion of the bore, while the other is spaced longitudinally toward the opposite end of the bore from the first passage, and opening from these passages there are respective pipe nipples or bosses 118 and 119, bored and tapped for communication with the respective passages and to receive hot and cold water pipes respectively indicated at 56' and 57'; and these may be the same pipes shown at 56—57 in Figure 1, suitably extended or shaped for the connection indicated. From the opposite or lower side of the casting, there is projected a central boss 120 likewise bored and tapped, to receive a discharge pipe 50', which may be continued to the pump by suitable extension in accordance with the disclosure in Figure 1, to function as the pipe 50 therein shown and heretofore described. Within the casting 90 open on and circumscribing the bore 97 between the passages 116—117, there is a channel 121, from which a port 122 opens into the bored and tapped boss 120. The port 122 is broadened longitudinally of the casting, as indicated, and has a crank arm 123 movable longitudinally of the casting therein, this arm being extended from a shaft 124 mounted revolubly below, and arranged transversely of, the casting bore 97. The extremity of the arm 123 swings closely adjacent the lower side of the reduced central body part 111 of the plunger valve, and two lugs 123' are formed on the body part 111 arranged to strike the end of the arm 123 as the valve reciprocates, and move the arm first in one direction and then the other. This shaft is mounted in any usual packing box, and extended exteriorly of the boss 120, being provided on its outer end with a crank arm 126, connected by a push rod 125, to the rocking trough 42, as shown in Figure 15, where the tanks 44 and 45 are indicated, with respective pipes 56' and 57' leading to valve 49—a and so indicated. The push-rod 125 is slidably mounted in a suitable guide 127, conventionally shown, but which it will be understood permits sufficient pivotal movement of the rod for free movement by the arm 126, this guide being located close to the upper end of the push-rod, so that the latter may be used to rock the trough 42 for the purposes indicated.

Near the extremity of the casting 90 next to the cap plate 115, there is formed on the lower side of the casting a tapped boss 128, from which a communicating passage 129 for valve operating water or other operating fluid is cored in the body casting, opening on the bore 97 to a suitable extent for the purposes hereinafter described, and if desired, longitudinal extensions 129' may open therefrom on the end of the casting, registering with terminations of a corresponding passage 130 in the cap plate 115. Engaged in the boss 128, there is a pressure supply pipe 131, which may lead from any suitable source of water under pressure, such as the outlet of the pump 51, or any usual water supply from household or street mains, or the like. This water is the operating water for the automatic valve, and is discharged independently of the water which passes to the spray head of the bath apparatus, as will subsequently appear.

From the passages 116 and 117 respective port slots 132 and 133 open through the wall of the bore 97, and these slots may be continuous throughout the circumference of the bore if desired. These slot ports are so spaced that with the valve at the left-hand position as shown in Figure 12, the land 113 will be immediately adjacent the slot port 132, so that upon movement of the valve toward the right it will immediately begin to close the slot 132. Slot 133 happens to be in alinement with the channel 114 at the opposite end of the valve, but without forming any operative connection for the port, the channel having no other communication in this position. The slot port 132 is, by this position of the valve, placed in communication with the channel 121 and port 122, so that water admitted from the pipe 56' will be passed to the discharge pipe 50' and may pass directly to the pump for movement to the spray head, or may pass through this pipe directly to the spray head without the use of the pump, in case the pipes 56' and 57' are connected to water main supplies instead of gravity tank shown in Figure 1. The operating water inlet passage 129 has communication with the bore 97 through the ports 134 at suitable intervals circumferentially, but spaced longitudinally from the cap plate 115 so that the plunger valve 98 will move to the right thereof on its operation from the position shown in Figure 12, sufficiently to bring the passage 114 into registry with the ports 134 from the passage 129. The land 135 immediately to the left of the channel 114 is somewhat broadened, at one part, and formed with a short longitudinal channel 136 at one part opening on the channel 114, and formed through the wall of the bore 97 for alinement with this channel 136 and communicating therewith when the valve is at the right hand limit of its movement, there is a transverse port 137 of small diameter, opening through the wall of the casting and having a pipe 138 leading therefrom to a passage 139 formed in the diaphragm housing, and opening through the outer half of the diaphragm housing in communication with the space at the outer side of the diaphragm. When the valve moves to the right and registers its channel 114 with the port 134 the groove 136 at the same time registers with the port 137, so as to supply operating water through the pipe 138 to the outer side of the diaphragm. With the valve in the left hand position as illustrated in Figure 12, this operating water is passed through the axial bore of the valve into the chamber 91, by which it acts against the diaphragm to move it to the left. At this left position of the valve the right end land of the valve closes the port 137. Means is provided for venting water from the respective sides of the diaphragm under pressure of the operating water through suitable controls, as will be subsequently explained. Also, when the valve is moved to its right position, the land 113 closes the port 132, while the land 135 uncovers the port 133 except at the broadened part of the land beside the groove 136, and thereby admits cold water from the pipe 57' to the channel 121 and port 122 for movement to the pipe 50' (to the pump or direct to the spray head, as before indicated).

Let into the lower side of the chamber 91, there is a bleeder pipe 140, extending downwardly, and a similar bleeder pipe 141 is connected to a T in the pipe 138, as in Figure 12. Both of these pipes extend downwardly and otherwise as required, to respective bleeder valves 142 conveniently located to permit dial setting devices 143 for the operation of the valves, to be located in a common mounting 144 set conveniently in the panel device 64. The setting devices in the present instance constitute the point members which may be fixed rigidly upon the stem of the bleeder valve in each instance. The valves 142 are operated respectively by the pointer hand devices 143, and these are associated with dial faces 145. By adjusting the valve in the pipe 141 the duration of the hot water application may be determined, in the present disclosure, and operation of the bleeder valve for pipe 140 determines the length of the cold water application. It will be noted that the discharge port 122 is always uncovered, and within the length of the central reduced part of the valve, that is—in a plane intersecting the reduced central part of the valve at right angles. The dial faces 145 may be suitably calibrated, and preferably, the right hand one, which determines the period of the cold water application, is numbered to indicate the seconds of time required for movement of the diaphragm, while the other one is numbered in multiples of five, to indicate the duration of warm water application, which ordinarily will extend over a longer period than the cold water application, where the invention is used in a pathological service. In other situations, however, the cold application may be of longer duration, and be even as long or longer than the period of hot water application, in which event the dial faces 145 may be correspondingly numbered and the valve associated therewith corresponding in proportion to produce the desired time interval indicated by the dial. Bleeding of water from the chamber 91 to the pipe 140 permits movement of the diaphragm when in left-hand position to its extreme right hand position, and bleeding of liquid from within the diaphragm case to the left of the diaphragm, through the pipe 141 permits opposite movement, and determines the length of period of hot water application, as will be readily understood.

It should be appreciated that when the installation utilizes the hot and cold water supplied from mains, as in Figure 16, the arm 123, shaft 124, and the stuffing box may be eliminated entirely from the automatic valve 49—a. It is believed preferable to use thermostatic mixing valves at 151, of which there are forms now commercially available, which may be set to deliver water at a predetermined temperature automatically when supplied adequately with hot and cold water supply at the inlets thereof.

As shown in Figure 16, hot and cold water pipes 56—a and 57—a, may be connected to the bosses 118 and 119, respectively, and these may lead from respective mixing valves 151, each of which has a hot and cold water supply, 152 and 153, respectively, so that the temperature for both the warm and cold applications may be regulated as desired to suit the special conditions. In this event, too, the pipe 154 leading from the nipple 120 at the discharge port of the valve 49—a may be led directly to the supply pipe for the spray nozzle in the cabinet, no pump being required, of course.

In the operation of this device, the cabinet being set up with the operative elements as described, and preliminary to the treatment of the patient—in case of the use of the tanks 44 and 45—the heater device 46 being in operation, the thermostat 47 is adjusted to insure the proper temperature for the case in hand. The water in the tank 45 may be tempered if freshly admitted from extremely cold supply by introduction of a sufficient amount of warm water, and in the event that it becomes warm during operation of the apparatus it may be cooled by admission of a fresh supply of cold water from any suitable source. The device 54 for regulating the pressure in the water supplied to the nozzle head is sufficiently adjusted, which may be done by operating the pump 51 for a time while the reading on the gauge 66 is observed. The timing devices 143 are then suitably adjusted to determine the periods of applications of the hot and cold showers, after which the cover 33, or the cover 77', or other is then shifted so as to open the cabinet, and in the case of the cover 33, the door 29 is swung outwardly and downwardly. The patient then takes a sitting position upon the mattress 23, and lowers himself to a reclining position with his head upon the pillow 28, while he swings his feet inwardly under the cover and upon the mattress, after which the door 29 is raised, and the cover 33 swung back to position. With the other styles of cover, the appropriate procedure will be readily understood from the description in my copending application.

The operation of the device of Figure 1 is now initiated by operation of the motor 65, no further manipulation being required with the valve 49—a in place since the latter will start operation automatically by reason of connection of the operating water pipe to either the pump outlet or to a source of pressure water supply, as before explained. In the case of use of a hand valve, first described, an attendant or the patient may operate the valve handle 58 at appropriate intervals, to alternate the warm and cold spray as desired.

In the operation of both the hand and the automatic valve, as the valve is shifted to admit cold water to the spray head, the tilting trough will be shifted to discharge the water returning therefrom to either the cold tank 45, or to the waste pipe 53', in case the cold water supply is from a pressure supply main, and when the valve operates to supply warm water to the spray head, the tilting trough will be shifted to return the warm water to the tank 44, in case the supply has been taken from such tank. In the event, however, that pressure mains, hot and cold water both are utilized, the tilting trough may be dispensed with, and the water returning from the tray in the several forms may pass directly to waste pipes of suitable construction.

From the foregoing, it will be seen that my automatic valve is adapted to administer a hot and cold alternated shower, with the period of each application independently determined upon so that a comparatively long period of warm spray may be intermitted by a very short spray of cold water, or, both the hot and cold spray may be made of short duration, or both of long duration comparatively. By the use of the thermostatic controls, the nature of the bath may be varied to suit radically different cases, as, for instance, for persons who are quite ill or of extremely low vitality and liable to excessive discomfort or injury by very hot or very cold water, the temperatures may be modified to suit the particular case.

In the claims "receiver" may be understood to refer to both a tank and reservoir and to a waste pipe.

It will be appreciated that if it is desired that the apparatus be used for a cold spray bath, or a warm spray bath, the respective valves 142 may be closed when the valve 98 is in proper position to supply the stream of the desired temperature and the valve 98 thus held in that position; or, where the mixing valves are available, they may be adjusted to supply water of the same temperature to both the pipes 56' and 57'.

While I have indicated a separate supply at 131 for the water operating the diaphragm, this is intended to enable use in a simple way of a constant pressure service water supply, when the pressure regulating valves controlling the pressure at the nozzle of the spray may maintain a low pressure at one time and a high pressure at another. But if desired, the water supplies to the valve case for passage to the nozzle may be utilized to operate the diaphragm if desired.

It should be noted that the maximum clearance through the valves 142 is sufficiently restricted to insure a back pressure in the respective spaces beside the diaphragm to insure the operation of the diaphragm by the water admitted thereto by the valve 98.

Where my valve 49—a is used in conjunction with the tanks 44 and 45, the supply connection 131 may be led from the pump outlet conduit between the pump and the pressure regulating valve 54, and the discharge ends of the vent pipes 140 and 141 may be extended to the tray 22, or respectively to the tanks 44 and 45. In case this tends to build an excessive liquid level in either tank, a level-balancing duct 161 may be connected between the two tanks at a level slightly above the normal liquid level in the cold water tank at least. It may lead to the bottom of the hot water tank. The amount of water thus interchanged will not be sufficient to materially affect temperature requirements in either tank.

In Figures 1—a and 1—b there are shown the details of a valve 49 adapted to move through 180 degrees in changing from one source to another for the supply to the spray nozzle in the upper part of the cabinet. In this instance, the valve case is formed with a usual conical seat therein from the upper part of which an outlet port 158 opens to the pipe 50 to the pump (or to the pipe 53 direct if a water main hot and cold water supply is used), and at the lower part of the case there are inlets 159 at diametrically opposite sides of the case, on an axis at right angles to the direction of the port 158, receiving respectively the pipes 56 and 57 or connections therewith leading from the hot and cold water tanks, or hot and cold water mains may be connected directly to the ports 159 if available. The plug valve shown is formed with a diametrical passage 157 therethrough in its upper part adapted to register at either end with the outlet port 158 while in its lower end there is a single port 160 opening downwardly from the passage 157 and laterally at right angles to the direction of the passage 157, so as to register alternately with the inlet ports 159, when the valve is moved through 180 degrees from one position to the other.

In Figure 3—b the cold water supply pipe 70 is shown connected directly to one of the inlets of the valve 49, a manually adjustable pressure regulating valve 71 being incorporated in the pipe 70. The waste pipe 63′ and tank 44 are arranged to alternate receiving relation to the tilting trough 42 as in Figure 3—a. The pipe 56 is connected directly to the intake 50 of the pump through a cross-T, and the outlet pipe 53 from the pump is led to the remaining intake of the valve 49, while a continuation 53′ is extended from the outlet of the valve corresponding to the pipe 53 of Figure 1, and to lead to the spray nozzle mechanism in the upper part of the cabinet as before indicated. A by-pass connection 52′ is formed between the pipe 53′ and the intake of the pump, through the cross-T, and the pressure regulating valve 54 incorporated therein, so that when pressure of the discharge from the pump exceeds that which is desired, the valve will by-pass a sufficient amount to lower the pressure in the pipe 53′ or other pipe to the spray nozzle in the cabinet the desired degree.

In incorporating my system with the automatic valve 49—a the latter may be mounted as shown in Figure 18, under the tanks, and in practice, it would be made much smaller in proportion to the size of the cabinet, having been enlarged for clarity in illustration. Figure 12 shows the approximate actual size of the device, as heretofore embodied, although it may be made larger, or its proportions between the operating diaphragm and the sliding valve varied. Thus the diaphragm and chamber and water connections are capable of operating a valve 98 of larger diameter and length, if necessary.

The pipes 56 and 57 are led directly into the top of the device 49—a and the pipe 50′ led to the pump, where the hot and cold water tanks are used, and when piped water supply is used the connections may be varied in accordance with Figures 3—a, 3—b, and Figure 16, as described. In the arrangement of Figures 15 and 18 the pipe 131 may be connected to the outlet 53 of the pump in advance of or beyond the connection of the by-pass 52 or 52′. Where a cold water supply from a water main is utilized, the connection of the pipe 131 may be made thereto directly, if desired.

In order to permit drainage of the tanks when desired, the valves 62 are connected by short nipples directly through the bottoms of the respective tanks, and to the drain 63, to which the overflow pipes 48 are connected. The handles or knobs 67 of these valves may be extended so as to be operable at the rear side of the cabinet in a panel 162, which may be closed by a door 163, or left open as desired. Within this panel there may be located the main switch 164 to the motor 65, closing or opening of which may be utilized for starting and stopping the apparatus. The guage 66 is also so located as to be within this panel, as shown, and an extension of the adjusting device of the pressure controlling regulating valve 54, the knobs 143 for setting the timing of the periods for hot water flow and cold water flow, and the thermostat setting device 47. This may be of a conventional type with any usual element in the tank 44 to operate a switch in the device 47. But in Figure 18 it is shown associated with a Bourdon guage 156, connected by a usual duct with a bottle 155 in the tank. The duct from the bottle may be connected with the thermostat 47 which may be of suitable construction for the use. The thermostat 47 and guage 156 may be located as desired, and in Figure 19 are shown as both located within the panel 162. In Figure 18 they are otherwise located for convenience in illustration. The guage, being free to indicate all pressures registered, will serve as an indication whether the thermostatic switch is functioning properly.

In incorporating the hot and cold water main arrangement of Figure 16, the motor 65 and pump 51, the tanks 44 and 45, the overflow pipes 48 and valves 62 and their connections are eliminated, as well as the heating device and its controls. In place of the switch 164 a master valve may be included in the pipe line 154 to the spray head, and valves in the hot and cold water mains used, these being sufficiently obvious expedients to require no illustration. The temperature regulating valves 151 are preferably of one of the commercially available automatic thermostatic temperature regulating mixing valves, the details of which comprise no novel part of the present invention and therefore not being illustrated. These valves as now marketed have a manual setting device by which the temperature maintained in the water passing may be varied at will by simply moving the setting member.

In Figure 20 there is illustrated an important construction of the connections between the diaphragm and the plunger valve 98 wherein the principal distinction is the elimination of the balls 96 and 104 (which might fail to maintain their proper positions at all times and so block movement of the valve), and the substitution of supporting stays having certain pivotal connections with the case and moving elements.

In this instance, the body casting 90′ is formed with a chamber 91′ and valve mounting parts the same as before described, except that it is not necessary to finish a raceway or other surface for the balls. A diaphragm housing extension 92′ is formed on the casting to which is bolted an outer housing plate 93′ and between these the diaphragm 94 is secured. However, a seat plate 165 of suitable form is interposed between the diaphragm and the part 92′ apertured to receive the stem 95′ of the diaphragm therethrough, but to support the base flange 166 of the stem, as well as the diaphragm itself when at the inner limit of its movement, thus minimizing strain and wear of the diaphragm. In place of the U-shaped member 102—103, a simple rectilinear link 167 is pivoted on the stem 99 of the valve, and normally extends under the stem 95′, which is located slightly above the axis of the valve, a space being afforded between the two for slight pivotal movement of both. The upper side of the stem 95′ is notched at 168, and a strut, stay, or link 169 has a lower terminal knife edge set therein, while a similar knife edge extremity at the upper end of the link 169 is set in a notch 170 formed in the wall of the chamber 91′ in such position that upward movement of the stem is opposed by the link 169.

The link 167 is supported at its lower side in a similar manner, a pivot strut or stay 171 having knife edge ends set in respective notches 172, 173, in the lower side of the link 167 and the inner face of the casting 96' therebelow, so as to support the link against downward movement to the extent indicated. The spring 108 is connected to the link 167 and stem 95' in the same relation as it was to the stem 95 and the pusher 102—103 of Figure 12. A single spring 108 mounted on pins fixed in the stem and link respectively may be used, or the pins may be extended through the stem and link or pusher, as shown in Figure 14, and a spring 108 mounted on each side of the axis of the stem as shown in the latter view.

In Figure 21 the invention is shown embodied in one of its most compact and simplest forms. Here the piped supplies of hot and cold water 152 and 153 are branched and connected to the two automatic thermostatic mixing valves 151 shown formally, and from which the respective supplies of warm and cold water of temperatures regulated according to the manual settings of the valves 151 are led through the pipes 56—a and 57—a to the inlet ports of the automatic valve 49—a located below the mixing valves.

Such pressure gauges and temperature gauges or thermometers, etc. may be installed as desired in accordance with Figures 18–19 or otherwise, or as discretion may dictate. For instance, the automatic pressure regulating valve 54' corresponding to the device 54 before described may be located in the pipe 154 from which the pipe is extended to the spray 167 and servo-motor 175 in the upper part of the cabinet which were designated 67 and 75 respectively, in my said prior application.

For convenience the vent pipes 140 and 141 are extended upwardly beside the tray 22, and formed with downturned ends arranged to discharge into the tray. The single waste pipe 53—a is connected directly to the bottom of the tray 23 to drain all water therefrom, hot or cold. The vent pipes from the speed control valves of my prior application (by which the rate of movement of the spray nozzle 167 is controlled), may be located as found most convenient for the manipulation of the valves, and the location of the devices 64 in this application is purely formal, and may be otherwise, as circumstances require.

It will be appreciated that my invention both as to the spray head and its operating mechanism and the hot and cold water supply system can be adapted to use in connection with private bath tubs, if desired, the automatic valve device with piped hot and cold water supplies and with the automatic thermostatic mixing valves being adapted to be installed in a small closet in the usual stud partitions.

My invention is useful in the practice of "somapathy" in which alternated applications of heat and cold to the spine are involved, and also in practice of "spondylotherapy" wherein concussive treatments of the spinal nerves is an important feature. The reactions desired will be greatly enhanced by the appropriate thermal extremes suitably alternated.

The spray device which, in my said prior application, was mounted upon a stand pipe 32 carried by the supporting frame-work of the bath tray, may be mounted in and directly on the cover of the cabinet in either form as herein disclosed, so as to be moved translatively therewith, and connections of the supply conduits made by means of conventional flexible hose or other ducts as an alternative to the connection shown in Figures 9 and 10. It is also possible, by rearrangement of parts in more compact form, to mount the spray device on a stationary support extended from the framing 21, so that limited movement of the cover 33 may be effected without interference.

Figure 17 presents an example of the spray unit carried by the movable cover, and movable therewith bodily when the cover is opened or closed.

If it is desired to use electrical controls for the timing of the flow of hot and cold water, respectively, this may be done with the arrangement shown in Figures 22 to 24, inclusive, which also includes great certainty in the maintenance of the period of flow of both the hot and cold water, in which respect it may have some advantages over some of the perviously described arrangements, due to the difficulty of calibrating in time the movement of elements operated by water pressure, which may vary at different times in the same apparatus. In the last mentioned devices, there is provided a simple valve 201, consisting of a case 202 having an upper inlet port 203 at one side, used for cold water in the present instance, and at its lower part a corresponding diametrically opposite inlet port 204, through which warm water is admitted, in the present instance, while at an intermediate level an outlet port 205 opens on a radius at right angles to the diameter on which the ports 203 and 204 are located. The case has a vertical cylindrical bore 206 entirely therethrough, communicating with which there is a central circumscribing channel 207 from which the port 205 opens, and upper and lower channels 208 and 209, respectively, communicating respectively with the ports 203 and 204. It will be noted that in the formation of the channels, the central channel is separated from the upper and lower ones by land walls 210, through which the bore 206 is continued. Slidably reciprocable in the bore of the case, there is a spool-type valve 211, having upper and lower lands or heads 212 and 213, respectively, connected by a reduced part 214, and extending upwardly from the valve there is a short stem 215 by which the valve is operated, as will be described. The head portions 212—213 are each of a similar length, and are at least long enough to alternately close communication between the respective channels 208 and 209 and the adjacent central channel 207, with adequate lap upon the portions of the bore above and below the upper and lower channels. As shown, the valve is in its lower position closing communication between the port 203 and the port 205, but permitting communication between the port 204 and the port 205, water passing inwardly from the port 204 to the channel 209, and then passing upwardly through the adjacent land wall 210 to the channel 207, from which the water passes directly to the port 205.

The device is operated by a solenoid device 216, having upper and lower coils 217—218, arranged to operate a core 219 which is connected to the stem 215 of the valve by a core stem 220 extended integrally from the lower end of the core and connected detachably to the stem 215, as indicated. The coils may be arranged closer together than shown, and the core correspondingly shortened to operate properly therewith, if desired, according to the requirements of use and convenience and economy in manufacture. The two coils are shown with a common mounting piece 221, to which may be connected a bracket piece 222, which in the present instance, is mounted directly upon the valve case 202. The mounting of the coils includes a top guide piece 223, and the core is formed with an upper stem portion 224 carried slidably in the guide-piece, conforming to conventional practice, and other conventional constructions of solenoids may be employed as discretion may dictate. In the present instance, the solenoid is utilized to operate the shifting trough 42, previously described, associated with the hot water tank 44, and the cold water tank 45, as previously indicated, and with the tray 22, which is not illustrated, however, in Figure 22, its outlet 38 being formally indicated. The solenoid core is connected to the trough 42 by means of a link 225 pivoted upon the upper end of the top stem 224, and suitably connected pivotally to the trough 42, at the under side, so as to rock the trough to incline the latter downwardly to the left when the valve 211 is in its lowered position, and to incline the trough 42 oppositely toward the tank 45 when the valve 211 is at its upper position.

In order to actuate the solenoid so as to operate the valve with appropriate duration of the period of flow of hot and cold water respectively, and to enable ready variation of such timing at will, a clock-work circuit closing device is provided, as shown in Figure 22, which may include any suitable clock-motor, formally indicated at 226, the details of which are not shown, since these comprise no novel features of the present invention and any conventional clock-work suitable for such use may be employed. The clock-motor includes a driven shaft 227, upon which there is mounted a radial switch arm 228. Mounted upon the case of the clock-work motor between the case and the arm 228, and concentric with the shaft 227, there is an annular plate of insulating material 229, forming a base for the mounting of concentric outer and inner conductor rings 230 and 231, respectively, between which there is arranged a third non-conductor ring 232, all three being spaced apart so as to afford clearances for the insertion of one or more contact pins 233, in engagement with either the ring 230 or the ring 231, as desired, at any desired position circumferentially. In the present instance, for convenience and safety of maintenance of position of the pin when positioned, the opposed edges of the plates are formed with a multiplicity of registered notches 234, and the pin is formed with a split shank 235 and of a size to engage frictionally in any two opposed notches with such slight compression of the two prong elements of the pin thus formed as may be desired. The pin is formed with a head portion 236, rounded on top and adapted to be engaged snugly upon the upper or outer surfaces of two adjacent rings between which the pin is inserted, and the arm 228 is so constructed as to engage slidably upon the rounded outer surface of the head of the pin as the arm is rotated by the clock-work motor. The innermost conductor ring 231 is connected by wire 237 to one terminal of the lower coil of the solenoid, while the outermost ring 230, is similarly connected by wire 238 to the upper coil 217. The opposite ends of both coils are commonly connected to one side of the line by which current is supplied to operate the device, and the other side of the line is connected or grounded on the clock-work motor, so that the arm 228 operates as a switch brush to complete a circuit through any inserted pin and through the respective conductor ring engaged by such pin to the respective coil of the solenoid. A battery 242 is indicated as the source of current in the present instance, but any other source of electricity may be utilized, including alternating or direct currents, which may be connected to the terminals 241 of the apparatus, as may be understood.

The requirements of use of cold water in systems such as described may involve shorter periods of application than the periods for application of warm water, and therefore the notches in the central and outer ring are shown much more closely spaced than those in the innermost conductor ring and adjacent edge of the central ring 232. However, if desired, an equal number of notches or pin holding portions may be provided at the inner ring.

The clock motor may be arranged to operate the switch arm 228 at any period for rotation which may be desired, but for example, the device is indicated as having the arm 228 timed to make one complete revolution every two minutes, and sixty sets of notches are formed in the outer ring and opposed portion of the central ring, so that the interval of time in the movement of the arm 228 from one such notch to the next, will be two seconds. In the present instance, there are shown twelve notches in the innermost ring and the opposed edge of the central ring, representing intervals of ten seconds between each two sets of notches, so that the flow of warm water may be varied in stages of ten seconds by insertion of one of the pins 233.

If very short intervals of both warm and cold water applications are desired, several alternations of flow may be effected during one rotation of the arms 228, but as shown in full lines in Figure 22, the device is arranged so that a flow of warm water will be maintained for a period of one minute and fifty-four seconds, and during the following six seconds, a flow of cold water will be effected, this being caused by the location of one of the pins 233 at the top or 12 o'clock position between the rings 231 and 232, while a second pin 233 is positioned between the outermost ring 230 and the central ring 232 in the third set of notches to the left of the twelve o'clock position. However, should a longer flow of cold water be desired, the outermost pin 233 would be adjusted further to the left. If a warm-water flow of longer duration than two minutes is desired, or cold water flow of a longer duration, so that the aggregate of the two periods is greater than two minutes, the clock-work mechanism may be arranged to move the arm 228 at a slower rate of speed, as will be appreciated. Thus, if the arm 228 is arranged to rotate once within a period of one hour, the outer set of notches 234 spaced as they are, would have a time-interval value of one minute, while the notches in the innermost ring would be spaced at intervals of five minutes each, and with the device so operating, periods of application of cold and warm water could be arranged to extend over several minutes in each instance. This would be advantageous in cases requiring extended cold applications, and for intervening applications of warm water as would be required in order to maintain the temperature of the body of the patient at a satisfactory level to avoid objectionable chilling. Likewise, long periods of cold water applications may be alternated with short periods of warm water applications, where such treatments are indicated by the nature of the case.

Other contact making devices than that specifically illustrated may be employed, if desired, and any conventional automatic switch devices suitable for such uses may be employed as discretion dictates.

In the utilization of the device last described, it will be understood that, warm and cold water connections being made at the port 204 and port 203, respectively, the port 205 is connected to the pipe 50 if the apparatus is used in the system shown in Figure 1, where the pump 51 is employed, but where piped supplies of hot and cold water and of adequate pressure are available, the respective supply pipe may be connected to the port 203 and port 204, and the port 205 connected directly to the pipe leading to the spray nozzle in the bath cabinet, which may be the pipe 154 of Figure 16, or the pipe 50' of Figure 15.

I claim:

1. In an apparatus of the character described, a bath device, a warm water supply, a cold water supply, a two-way valve having two inlet ports connected respectively to the warm water supply and the cold water supply and having a delivery outlet to said bath device and means operative by pressure water flow to operate the valve alternately to opposite extreme positions.

2. The structure of claim 1 including a warm water receiver and a cold water receiver, an intermediate receiving duct in receiving relation to the output of the valve, and movable alternately into delivery relation to respective said receivers, and operative connections between the intermediate duct and said valve whereby when the valve is in receiving relation to said warm water supply the intermediate duct will incline to said warm water receiver, but when the valve is in receiving relation to said cold water supply the intermediate duct will incline to said cold water receiver.

3. In an apparatus for treating neuropathic and psychopathic cases, and for improving metabolism in the human system, by intermitted shocks of cold water, a bath device including means to apply water jets over a large area of the human trunk and limbs, a warm water supply, a cold water supply, a valve device comprising a case having two inlet ports connected respectively to the warm water supply and the cold water supply and having a delivery outlet to said bath device, a valve movable in the case to alternately close the inlet ports at respective limits of movement of the valve, a constant operating device, and operative connection therefrom to the valve whereby to operate the valve alternately to opposite extreme positions.

4. In an apparatus of the character described, a bath device, a warm water supply, a cold water supply, a valve device comprising a case having two inlet ports connected respectively to the warm water supply and the cold water supply, a valve movable in the case to alternate extreme positions in closing relation respectively with the inlet ports to close one and open the other and having a delivery outlet connected to the bath device, means to operate the valve alternately to said extreme positions; and in which said warm water supply consists of a reservoir, a heater therefor, a water collecting tray beneath the bath device having an outlet, a cold water receiver adjacent the reservoir, a movable duct constantly in receiving relation to said tray outlet inclined alternately to said receiver and said reservoir, and operative connections between said valve and said movable duct constructed, arranged and adapted so that when the valve is open to the cold water supply the duct will incline to said receiver, and when the valve is open to the warm water supply the duct will incline to the said reservoir.

5. The structure of claim 4 in which a pump is incorporated in receiving-relation to at least the warm water supply and connected in delivery relation to at least one inlet of said valve.

6. In a system of the character described, a valve having an operating part movable between opposite limits, and having two inlets and an outlet, the valve being constructed to connect the inlets alternately to the outlet at respective positions of the valve, a first liquid reservoir, a second liquid reservoir, a movable duct in constant receiving relation to the said outlet movable alternately to delivery relation to said first and second reservoirs and operative connections between the said operative part of the valve and said movable duct constructed, arranged and adapted to move the said movable duct to respective said delivery positions when the valve is at respective limits of its movement.

7. In a water temperature alternating device for baths of the character described comprising a case provided with two inlet ports and an outlet port, valve means movable in said case between two alternately spaced positions and constructed and arranged to establish communication between the outlet and one or the other of the inlets respectively in its alternate positions, a diaphragm housing associated with said case, a diaphragm therein forming pressure chambers on opposite sides of said diaphragm, said diaphragm being movable by the difference in pressure existing in said chambers and connected to said valve, said valve and said case each being provided with an operating fluid port means communicating respectively with the pressure chambers, an operating fluid inlet in the case, said valve being additionally constructed and arranged in its respective positions to alternately establish communication between said operating fluid inlet and the port means, vent means for each of said pressure chambers restricted relative to said port means, the entire arrangement being such that movement of the valve to its one position effects control of the operating port means so as to cause movement of the valve means to its other position and vice versa.

8. The structure of claim 7 in which said vent means includes respective ducts opening from each side of the diaphragm housing and manual valves therein for the purpose described.

9. In apparatus of the character described, a valve device comprising a case, a diaphragm chamber associated therewith, a diaphragm connected thereacross for movement by pressure predominating alternately on opposite sides of the diaphragm, a further chamber in the case extending generally normal to the plane of the diaphragm having a bored terminal part provided with two spaced supply ports and a delivery port, and a valve in said part movable between respective limits, said valve being constructed and arranged to connect the supply ports alternately with the delivery ports at respective limits of its movement, operating pressure supply means, said valve device including means to form operative pressure connections between said supply means and opposite sides of said diaphragm alternately, said valve being further constructed and arranged in its respective positions to close said last named connections to the respective sides of said diaphragm alternately, restricted means to vent liquid from each side of said diaphragm, constructed to cause diaphragm displacement by predominant pressure at the side with which said operative pressure connection is made, a stem carried by the diaphragm projected toward said valve, a valve driver slidable in the further chamber in lapped relation to the said stem, a spring connected under compression between the extreme part of the driver toward the diaphragm and the extreme part of the stem distant from the diaphragm, the movement of the driver being within lesser limits than the movement of the stem, and said connection of the stem with the spring being arranged so as to pass longitudinally beyond the connection of the spring with the driver in each direction when the driver is at the same respective limits of its movements, whereby the spring may expand and move the valve in the opposite direction, and an operative connection between the driver and valve.

10. The structure of claim 9 in which the last named connection is a lost motion connection, the lost-motion therein being materially less than the extent of movement of the stem.

11. The structure of claim 9 in which a rolling anti-friction member is confined between the side of the stem and wall of the further chamber portion in the general direction of pressure of the spring, and a rolling anti-friction member confined between the driver and wall of the further chamber portion at the opposite side of the latter.

RALPH E. SCHURTZ.